(12) United States Patent
Goossens et al.

(10) Patent No.: US 10,377,232 B2
(45) Date of Patent: Aug. 13, 2019

(54) METHOD FOR SYNCHRONIZATION CONTROL OF RAPID CONNECT AWD SYSTEMS

(71) Applicant: DANA AUTOMOTIVE SYSTEMS GROUP, LLC, Maumee, OH (US)

(72) Inventors: Stijn Goossens, Erpe-Mere (BE); Mark R. J. Versteyhe, Oostkamp (BE); Thomas J. Vyncke, Deinze (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/573,195

(22) PCT Filed: May 12, 2016

(86) PCT No.: PCT/US2016/032107
§ 371 (c)(1),
(2) Date: Nov. 10, 2017

(87) PCT Pub. No.: WO2016/183324
PCT Pub. Date: Nov. 17, 2016

(65) Prior Publication Data
US 2018/0126848 A1    May 10, 2018

Related U.S. Application Data

(60) Provisional application No. 62/160,240, filed on May 12, 2015.

(51) Int. Cl.
*F16D 48/06* (2006.01)
*B60K 23/08* (2006.01)
*B60K 17/344* (2006.01)

(52) U.S. Cl.
CPC ............ *B60K 23/08* (2013.01); *B60K 17/344* (2013.01); *B60K 23/0808* (2013.01);
(Continued)

(58) Field of Classification Search
CPC ............... F16D 48/06; F16D 2500/104; F16D 2500/10406; F16D 2500/10431;
(Continued)

(56) References Cited

U.S. PATENT DOCUMENTS 4,709,775 A    12/1987  Watanabe et al.
4,775,581 A    10/1988  Siniscalchi
(Continued)

FOREIGN PATENT DOCUMENTS

CN    101084130 A    12/2007
CN    102563034 A     7/2012
(Continued)

OTHER PUBLICATIONS

European Patent Office, International Search Report with Written Opinion issued in PCT/US2016/032107, dated Aug. 19, 2016, 10 pages, European Patent Office, Rijswijk, Netherlands.
(Continued)

*Primary Examiner* — Edwin A Young
(74) *Attorney, Agent, or Firm* — Marshall & Melhorn, LLC (57) ABSTRACT

A method of controlling an all-wheel-drive system connect event including providing a power transmission apparatus having a clutch, a propeller shaft, and a rear drive unit with a clutch pack assembly. The rear drive unit clutch pack is actuated by creating a model of the propeller shaft rotational speed, adapting the model parameters to compensate for temperature and vehicle wheel speed, storing the model, adapting the model utilizing information collected during a previous all-wheel-drive system connect event, and developing a set point for the clutch driving element utilizing the model and a multi-loop control architecture. The power transmission apparatus clutch is then engaged.

8 Claims, 10 Drawing Sheets

(52) U.S. Cl.
CPC ...... *F16D 48/06* (2013.01); *B60K 2023/0825* (2013.01); *B60K 2023/0833* (2013.01); *F16D 2500/1023* (2013.01); *F16D 2500/1045* (2013.01); *F16D 2500/10431* (2013.01); *F16D 2500/10462* (2013.01); *F16D 2500/30415* (2013.01); *F16D 2500/30421* (2013.01); *F16D 2500/30426* (2013.01); *F16D 2500/3115* (2013.01); *F16D 2500/50251* (2013.01); *F16D 2500/50275* (2013.01); *F16D 2500/5102* (2013.01); *F16D 2500/5122* (2013.01); *F16D 2500/7041* (2013.01); *F16D 2500/7061* (2013.01); *F16D 2500/7082* (2013.01); *F16D 2500/70605* (2013.01); *F16D 2500/70626* (2013.01); *F16D 2500/70652* (2013.01); *F16D 2500/70668* (2013.01)

(58) Field of Classification Search
CPC . F16D 2500/50251; F16D 2500/50275; F16D 2500/5102; F16D 2500/7041; F16D 2500/70605; F16D 2500/7061; F16D 2500/7082
See application file for complete search history.

(56) References Cited

U.S. PATENT DOCUMENTS

| | | | |
|---|---|---|---|
| 5,492,194 A | 2/1996 | McGinn et al. | |
| 5,605,201 A | 2/1997 | McGinn et al. | |
| 5,631,829 A | 5/1997 | Takasaki et al. | |
| 5,819,194 A | 10/1998 | Hara et al. | |
| 5,867,021 A | 2/1999 | Hancock | |
| 5,989,146 A | 11/1999 | Brown et al. | |
| 6,232,739 B1 | 5/2001 | Krefta et al. | |
| 6,450,921 B1 | 9/2002 | Glab et al. | |
| 6,714,003 B2 | 3/2004 | Babin | |
| 6,815,944 B2 | 11/2004 | Vig et al. | |
| 6,922,623 B2 | 7/2005 | Rieger et al. | |
| 6,990,354 B2 | 1/2006 | Kantola et al. | |
| 7,026,808 B2 | 4/2006 | Vig et al. | |
| 7,054,732 B2 | 5/2006 | Rieger et al. | |
| 7,101,310 B2 | 9/2006 | Smith et al. | |
| 7,125,364 B2 | 10/2006 | Cring | |
| 7,258,648 B2 | 8/2007 | Smith et al. | |
| 7,491,145 B2 | 2/2009 | Mizon et al. | |
| 7,603,219 B2 | 10/2009 | Joshi et al. | |
| 7,611,441 B2 | 11/2009 | Cring | |
| 7,813,857 B2 | 10/2010 | Mizon et al. | |
| 8,042,642 B2 | 10/2011 | Marsh et al. | |
| 8,047,323 B2 | 11/2011 | Downs et al. | |
| 8,050,835 B2 | 11/2011 | Wilson et al. | |
| 8,234,050 B2 | 7/2012 | Burns et al. | |
| 8,401,756 B2 | 3/2013 | Wilson et al. | |
| 8,442,793 B2 | 5/2013 | Goodwin | |
| 8,584,785 B2 | 11/2013 | Marsh et al. | |
| 9,272,619 B2 | 3/2016 | Quehenberger et al. | |
| 9,493,069 B2 | 11/2016 | Marsh et al. | |
| 9,638,548 B2 | 5/2017 | Mialtu et al. | |
| 2004/0040759 A1* | 3/2004 | Shimizu | B60K 6/44 180/65.225 |
| 2007/0294017 A1 | 12/2007 | Joshi et al. | |
| 2008/0277240 A1* | 11/2008 | Kato | F16D 25/02 192/48.606 |
| 2010/0094519 A1 | 4/2010 | Quehenberger et al. | |
| 2012/0041654 A1 | 2/2012 | Wilson et al. | |
| 2012/0247611 A1* | 10/2012 | Martin | B60K 17/35 141/1 |
| 2016/0236568 A1 | 8/2016 | Quehenberger et al. | |

FOREIGN PATENT DOCUMENTS

| | | |
|---|---|---|
| DE | 102008032476 A1 | 1/2010 |
| FR | 2933913 A1 | 1/2010 |

OTHER PUBLICATIONS

China National Intellectual Property Administration, Office Action in Application 201680027333.0, dated Oct. 8, 2018, 13 pages.

* cited by examiner

METHOD FOR SYNCHRONIZATION CONTROL OF RAPID CONNECT AWD SYSTEMS

BACKGROUND

All-wheel drive capable vehicles have many advantages over vehicles having a driveline connected to only a single axle. Specifically, all-wheel drive capable vehicles have increased traction and enhanced drivability over similar vehicles that are driven using only a single axle.

However, traditional all-wheel drive vehicles are disadvantaged by requiring continuous rotation of a second drive axle, and other portions of the driveline, at road speed, even when the all-wheel drive functionality is not beneficial. Consequently, traditional all-wheel drive vehicles tend to have reduced fuel, and overall, efficiency when compared to vehicles having only a single drive axle.

All-wheel drive vehicles are increasingly equipped with a secondary driveline disconnect feature. In such vehicles, when a control system detects that all-wheel drive functionality is not required, the control system disconnects the second drive axle (and other associated driveline components) to place the driveline into a single axle drive mode. Once the second drive axle is disconnected, there is no transfer of torque to the second drive axle. As a result, speed-dependent losses associated with the second drive axle (and other associated driveline components) are eliminated by allowing the second drive axle (and other associated driveline components) to remain in an idle condition. A secondary driveline disconnect feature may also allow a control of the torque delivered by the secondary axle. The former aids in decreasing the vehicle's fuel consumption, and the latter provides a very flexible torque control.

Typically, as part of a AWD system connect event, a secondary driveline disconnect propeller shaft rotational speed measurement is performed by measuring the time between the passing of two teeth of a rotating part such as a gear or tone wheel. In the known method, the rotational distance between two teeth of the rotating part is accurately known. The known method includes measuring two subsequent rising edges or two subsequent falling edges of teeth on the rotating part. Dividing the known position increment by the time provides an estimate of the propeller shaft rotational speed. Alternatively, a pulse counter can be used to account for the number of pulses in a given sampling period.

However, this method results in delayed and inaccurate measurements, especially at low propeller shaft rotational speeds, i.e., a low pulse count. The challenge remains to have an all-wheel drive vehicle which transitions from the disconnected (two-wheel drive) state to the connected (four-wheel drive) state in such a way that the vehicle operator does not feel the transition from two-wheel drive to four-wheel drive.

The disclosure herein describes a method and system for actuating a clutch utilizing an adaptable model and a high resolution measurement of the rotational speed of a propeller shaft.

BRIEF DESCRIPTION OF THE SEVERAL VIEWS OF THE DRAWINGS

The accompanying drawings, incorporated herein as part of the specification, illustrate the presently disclosed subject matter, and with the description, serve to explain the principles of the disclosed subject matter and to enable a person skilled in the pertinent art to make and use the disclosed subject matter.

DETAILED DESCRIPTION OF EMBODIMENTS

It is to be understood that the presently disclosed subject matter may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
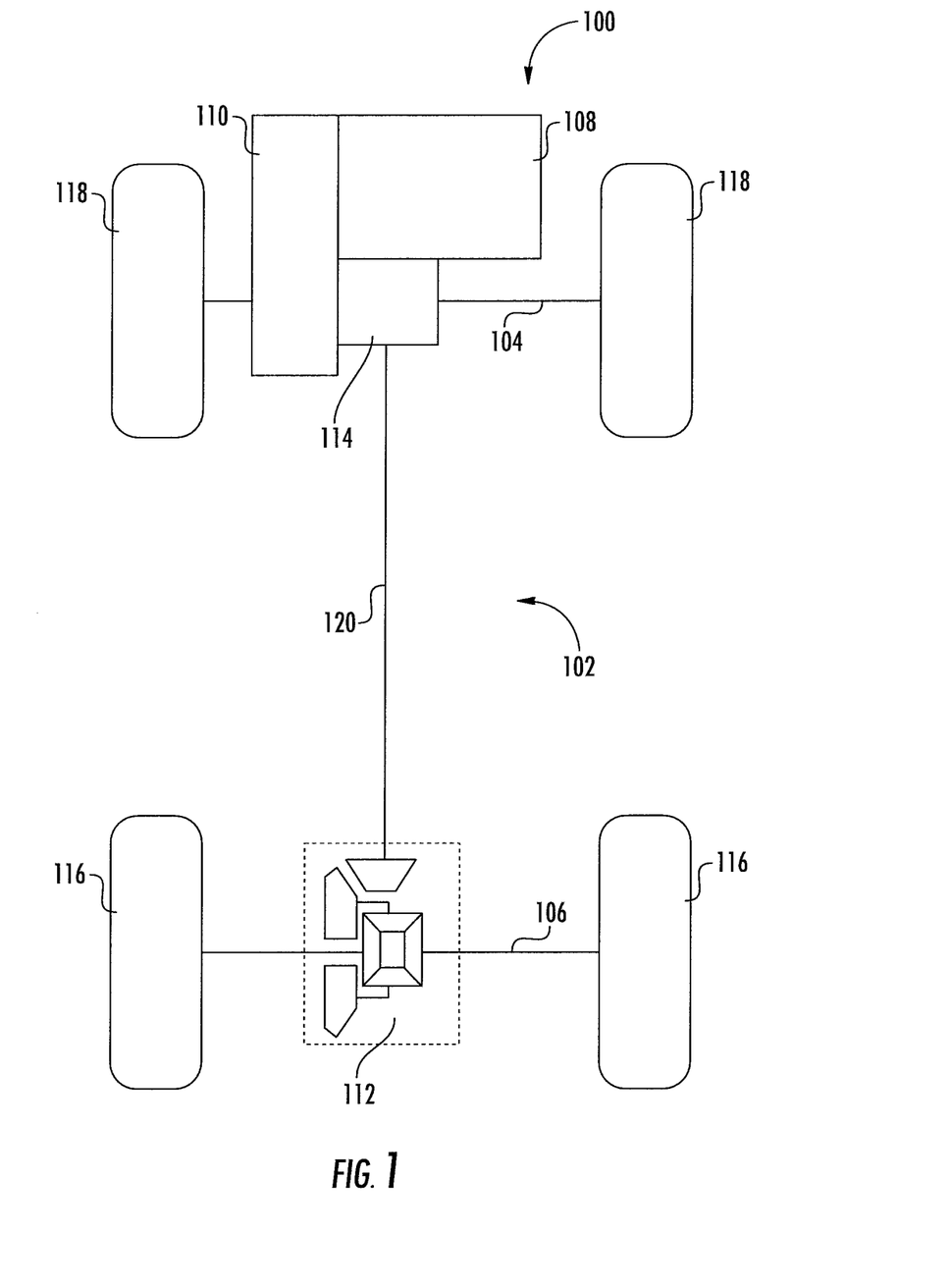
FIG. 1 is a schematic diagram of a portion of an automobile driveline having primary and secondary wheel sets according to an embodiment of the presently disclosed subject matter.

FIG. 1 illustrates an embodiment of the presently disclosed subject matter wherein a front wheel drive vehicle 100 includes a driveline 102 having a primary axle 104 and a secondary axle 106 creating all-wheel drive functionality. The driveline 102 comprises a power source 108, a transmission 110, a rear drive unit 112, a power transmission apparatus 114 (e.g., a power transfer unit), a pair of rear wheels 116, and a pair of front wheels 118. The rear drive unit 112 includes a clutch pack(s) (not depicted) capable of controlling torque to the pair of rear wheels 116 and the rotation of a propeller shaft 120. The propeller shaft 120 is disposed between the power transfer unit 114 and the rear drive unit 112. The power transmission apparatus 114 connects and disconnects the propeller shaft 120.

Figure 2:
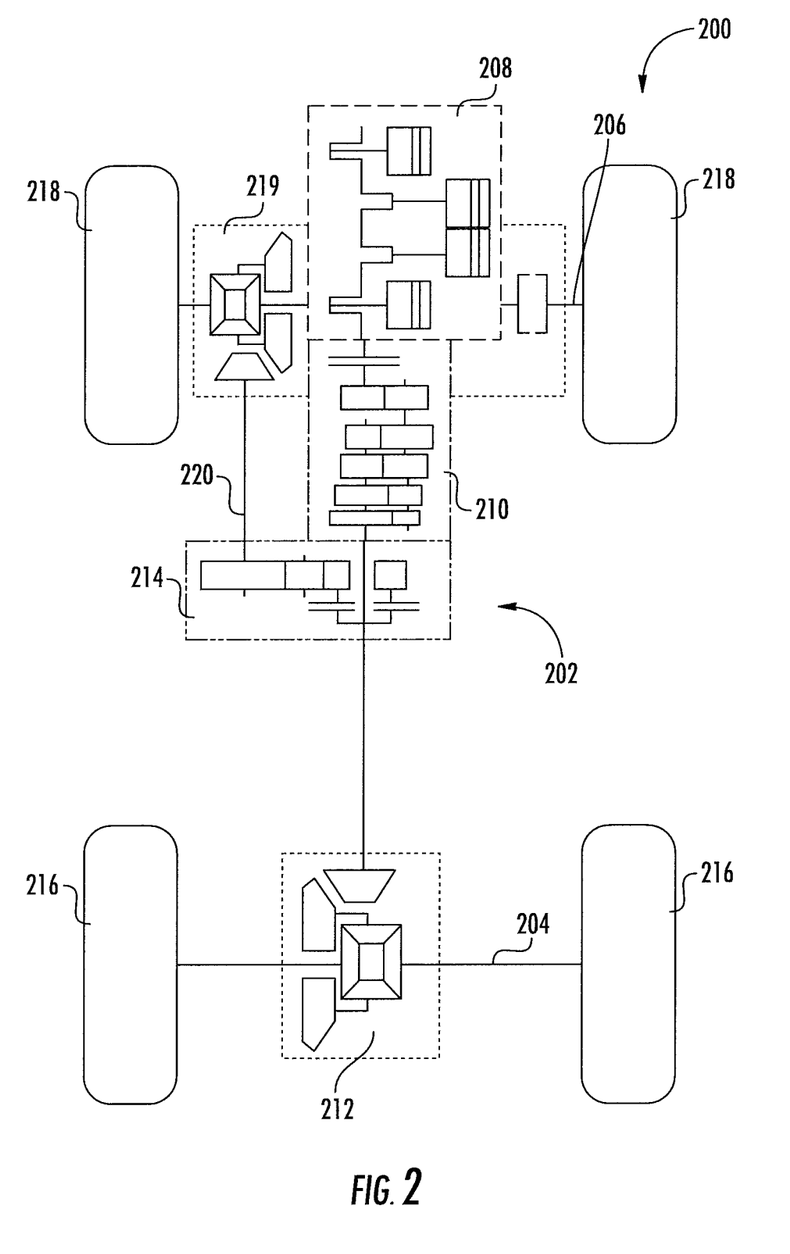
FIG. 2 is a schematic diagram of a portion of an automobile driveline having primary and secondary wheel sets according to another embodiment of the presently disclosed subject matter

In another embodiment, illustrated in FIG. 2, the presently disclosed subject matter may be utilized with a rear wheel drive vehicle 200 having a driveline 202. The driveline 202 comprises a primary axle 204 and a secondary axle 206 creating all-wheel drive functionality. The driveline 202 further comprises a power source 208, a transmission 210, a rear drive unit 212, a power transfer apparatus 214 (e.g., a transfer case), a pair of rear wheels 216, a pair of front wheels 218, and a front drive unit 219. The power transmission apparatus 214 is utilized to spin up a propeller shaft 220 coupled with the half shafts coupled with the pair of front wheels 218.

Figure 3:
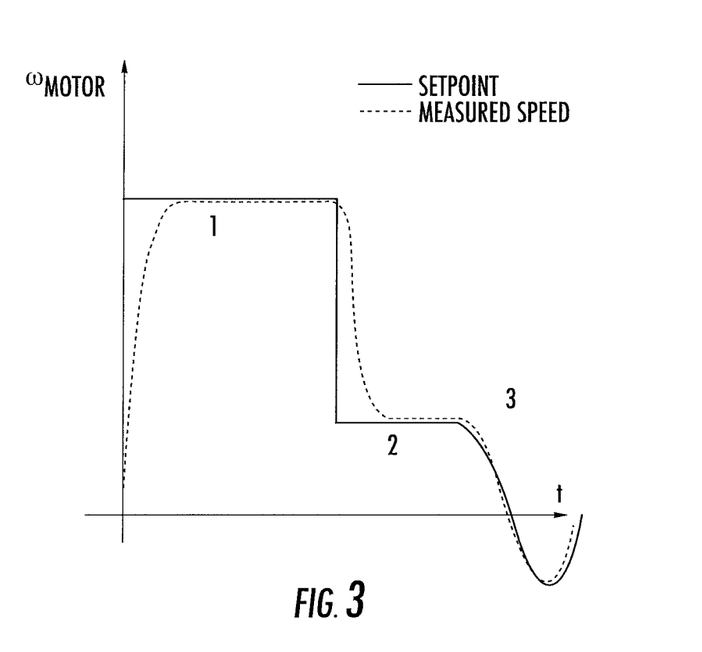
FIG. 3 is a graph illustrating the actuation phases of a clutch according to an embodiment of the presently disclosed subject matter.
Figure 4:
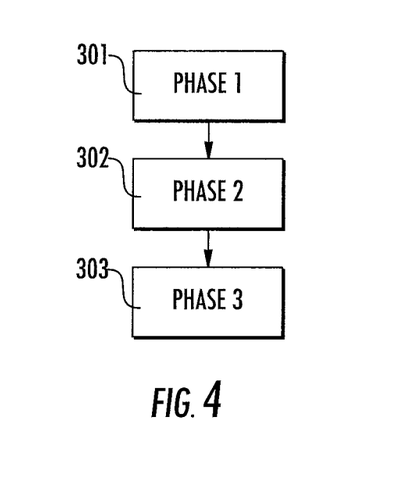
FIG. 4 is a flow chart illustrating the actuation phases of a clutch according to FIG. 3.

The subject matter disclosed herein is further described in relation to the vehicle layout depicted in FIG. 1. The present subject matter provides a method of actuating the clutch in the rear drive unit 112 and/or a clutch (not depicted) in the power transfer unit 114. In an embodiment, the power transfer unit 114 may comprise a dog type clutch. As illustrated in FIGS. 3 and 4, the actuation of one or both clutches comprises three phases. The first phase 301 includes a propeller shaft 120 high rotational speed phase, indicated in FIG. 3 by the numeral '1'. The first phase 301 typically occurs at maximum clutch-actuation-motor (not depicted) speed, and the gap between the clutch plates is closed rapidly. The duration of the first phase 301 depends upon the position of the clutch kiss point and the clutch-actuation-motor dynamics.

The second phase 302 includes a propeller shaft 120 low rotational speed phase, indicated in FIG. 3 by the numeral '2'. In the second phase 302, the actuation of the clutch plates is approaching the clutch kiss point. The second phase 302 allows greater control of the propeller shaft 120 rotational speed. The choice of the second phase 302 propeller shaft 120 rotational speed can be made as a function of the wheel 116, 118 speeds.

The third phase 303 is a propeller shaft 120 controlled rotational speed phase, indicated in FIG. 3 by the numeral '3'. The third phase 303 involves closing the gap between the clutch plates, and increasing a rotational torque applied to the propeller shaft 120 until the applied torque is higher than the friction torque (static torque) of the propeller shaft 120 and the propeller shaft 120 begins rotating.

Figure 5:
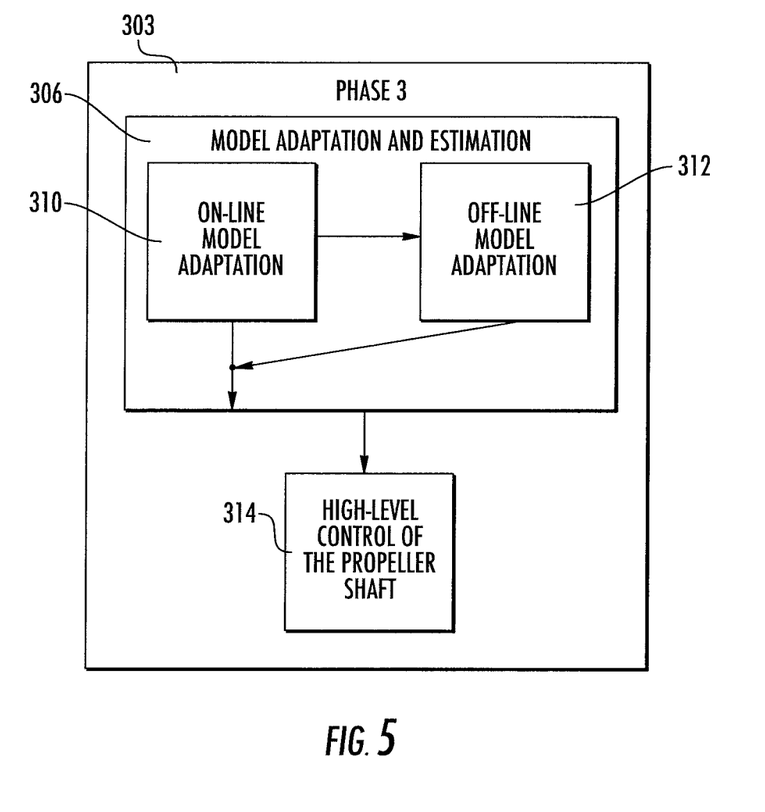
FIG. 5 is a flow chart illustrating the steps of phase 3 according to FIG. 3.

As illustrated in FIG. 5, the third phase 303 of the clutch actuation may be described in two parts, first, the model estimation and adaptation 306, and second, the high-level controls 314. In the first part, two types of model adaptions may be utilized to control the propeller shaft 120 rotational speed—an on-line model adaptation 310 and/or an off-line model adaptation 312.

Figure 9:
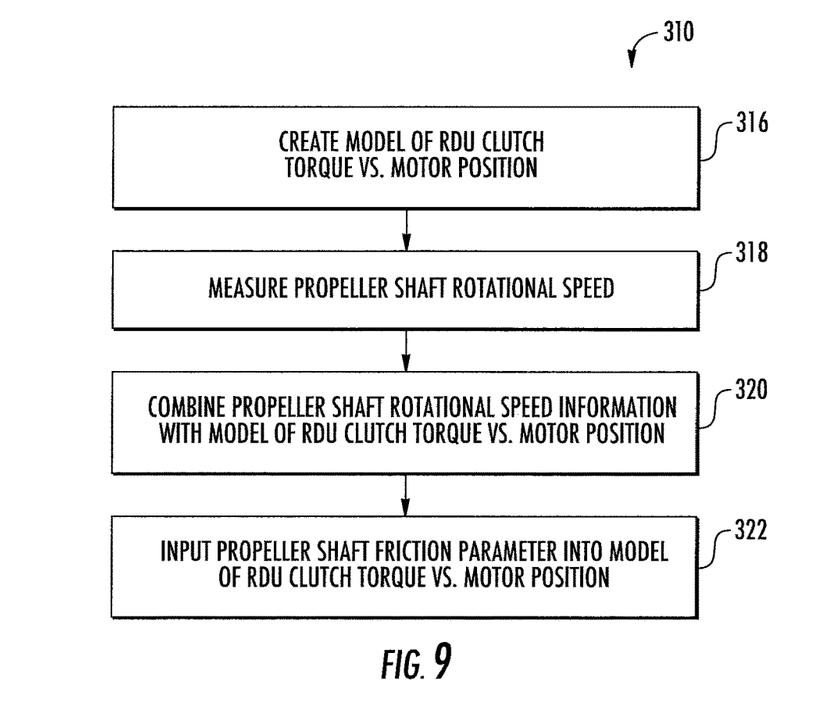
FIG. 9 is a flow chart illustrating a method of on-line model adaptation according to FIG. 5.
Figure 10:
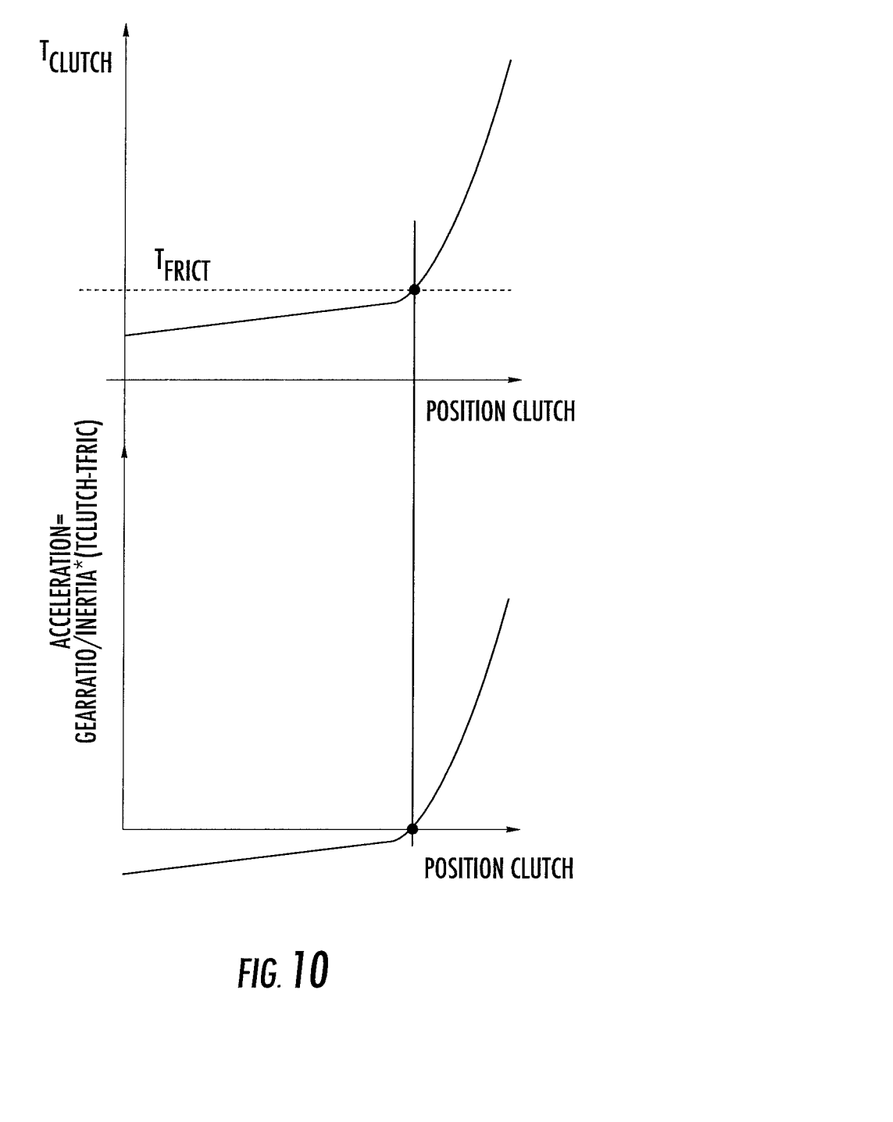
FIG. 10 is a graph illustrating shaft friction as variable during a clutch connect event according FIG. 5.

As illustrated in FIGS. 5 and 9, the on-line model adaptation 310 updates based on the propeller shaft 120 rotational speed information entering the system during a AWD connect event. In the on-line model adaptation 310, a step 316 comprises creating a model that resembles the relationship between the clutch torque and the clutch-actuation-motor position. A limited number of system parameters are estimated, including, but not limited to, the friction acting on the propeller shaft 120. FIG. 10 illustrates an example of learning the friction acting on the propeller shaft 120. As this friction is prone to external influences, and a difference between static and dynamic friction occurs, it is difficult to know the friction value in advance, making on-line model adaptation an elegant solution.

Figure 6:
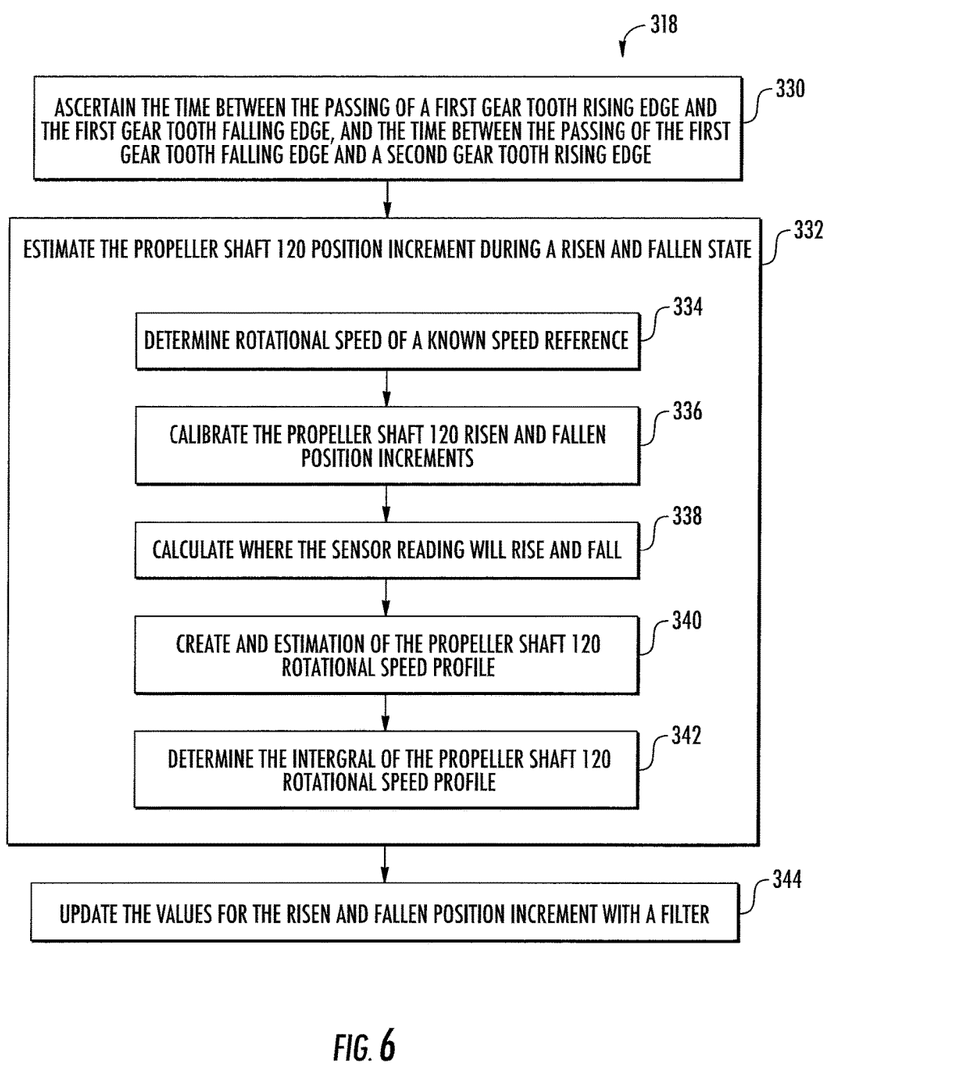
FIG. 6 is a flow chart illustrating a method of high resolution speed measurement of a propeller shaft according to FIG. 3.
Figure 7:
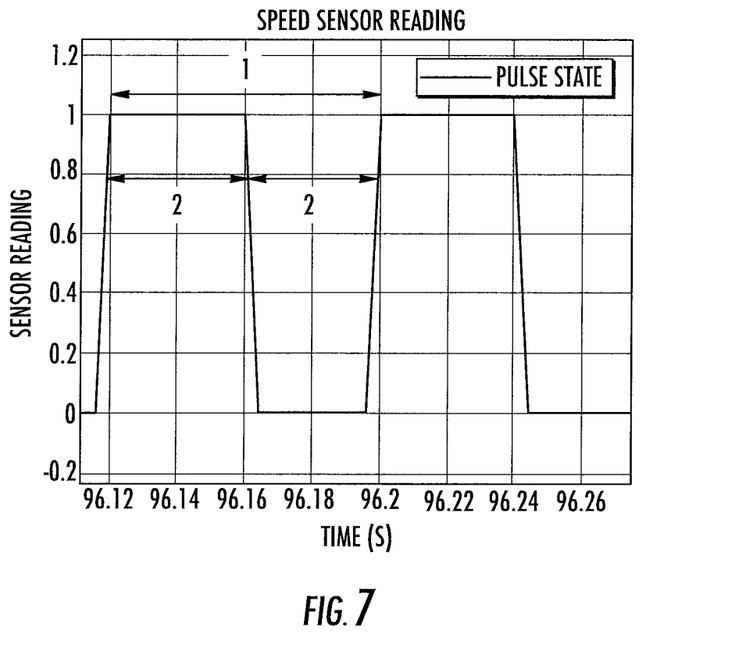
FIG. 7 is a graph illustrating a high resolution rotational speed measurement of a target wheel according to FIG. 6.
Figure 8:
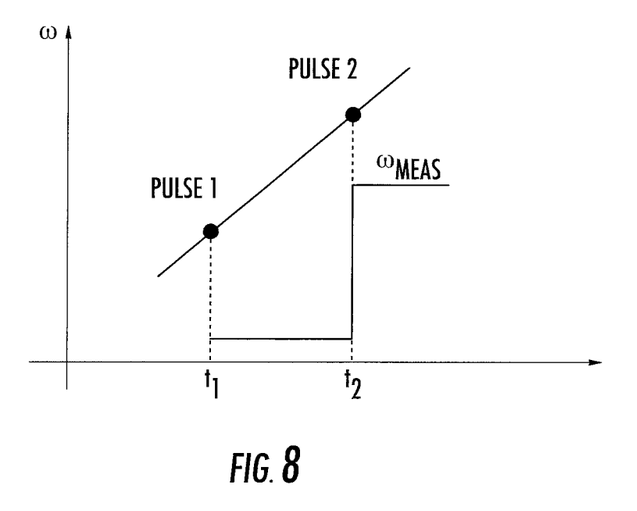
FIG. 8 is a graph illustrating the measured rotational speed of a shaft as compared with the actual rotational speed of the shaft according to FIG. 6.

The on-line model adaptation 310 next includes a step 318 which comprises high resolution measuring of the propeller shaft 120 rotational speed. The method of high resolution measurement 318 may be utilized to provide more frequent updates to high-level controls 314—that determine actuation of a clutch in the secondary driveline disconnect system—during the third phase 303. As illustrated in FIGS. 6-8, the method 318 of measuring the propeller shaft 120 rotational speed includes utilizing a sensor (not depicted) to ascertain a sensor pulse frequency 330 comprising the time between the passing of predetermined points on a rotating part such as a gear wheel (not depicted). In an embodiment, the gear wheel may comprise a bevel gear coupled with the propeller shaft 120 or coupled with a differential case. In an embodiment, a tone wheel may be utilized instead of a gear wheel. More specifically, as illustrated in FIG. 7, the method 318 of measuring the propeller shaft 120 rotational speed includes ascertaining the time between the passing of a first gear tooth rising edge and the first gear tooth falling edge, and the time between the passing of the first gear tooth falling edge and a second gear tooth rising edge of a gear wheel. This step provides a more accurate measurement of the propeller shaft 120 rotational speed even at low propeller shaft 120 rotational speeds.

The frequency 330 between two sensor pulses, the risen and fallen (on and off) states, measures the average propeller shaft 120 rotational speed between the two sensor pulses. However, as illustrated in FIG. 8, the change in the propeller shaft 120 rotational speed during data acquisition and processing is significant, and the actual propeller shaft 120 rotational speed will always be higher than the perceived propeller shaft 120 rotational speed indicated by the sensor pulse frequency 330.

To account for the propeller shaft 120 acceleration during data acquisition and processing, the method 318 of measuring the propeller shaft 120 rotational speed includes utilizing a routine 332 to estimate the propeller shaft 120 position increment obtained during a risen and fallen state. The routine 332 includes a step 334 comprising determining the rotational speed of a known speed reference, a step 336 comprising calibrating the point where the propeller shaft 120 sensor reading will rise and fall, and a step 338 comprising calculating where the propeller shaft 120 sensor reading will rise and fall.

The known speed reference may be the vehicle 100 wheel 116, 118 speed when the rear drive unit 112 clutch is engaged. In the step 336, the wheel 116, 118 speed may be utilized to determine the actual propeller shaft 120 rotational speed, which may be compared with the propeller shaft 120 risen and fallen position increment, or input pulse. The traditional rotational speed calculation method described in the Background may also be compared with the propeller shaft 120 rotational speed to perform the calibration step 334. In a step 340, an accurate estimation of the propeller shaft 120 rotational speed profile may then be made.

The routine 332 further includes a step 342 of determining an integral of the propeller shaft 120 rotational speed profile. Utilizing the integral of the propeller shaft 120 rotational speed profile and the sensor risen and fallen state times, the risen and fallen position increment may be estimated. Accuracy checks may be performed, as the sum of the risen and fallen position increment is known in advance, and is not subject to change. Filters may then be utilized to update the values for the risen and fallen position increment in a robust way. The filter utilized may include, but is not limited to, a Kalman filter and/or a (recursive) least square filter.

The on-line model adaptation 310 further includes a step 320 combining the propeller shaft 120 rotational speed sensor information with the model 316 of the clutch torque and clutch-actuation-motor position relationship. The step 320 allows the propeller shaft 120 friction to be determined, among other parameters. A step 322 of the on-line model adaptation 310 includes inputting the propeller shaft 120 friction parameter into the model 316. The friction parameter in the model 316 may be initialized, for example, by measuring the friction parameter of the clutch off-line. As the propeller shaft 120 friction changes during a clutch actuation event (e.g., static versus dynamic friction), the propeller shaft 120 friction is a parameter which is variable over the time of a clutch actuation event (see FIG. 10).

$$\theta_i = \int\int_0^{T_i} \omega_{prop}$$

$$\theta_i = \frac{gearratio}{Inertia} \int\int_0^{T_i} (T_{clutch,model}(pos_{clutch}(t)) - T_{frict}(t))$$

Figure 11:
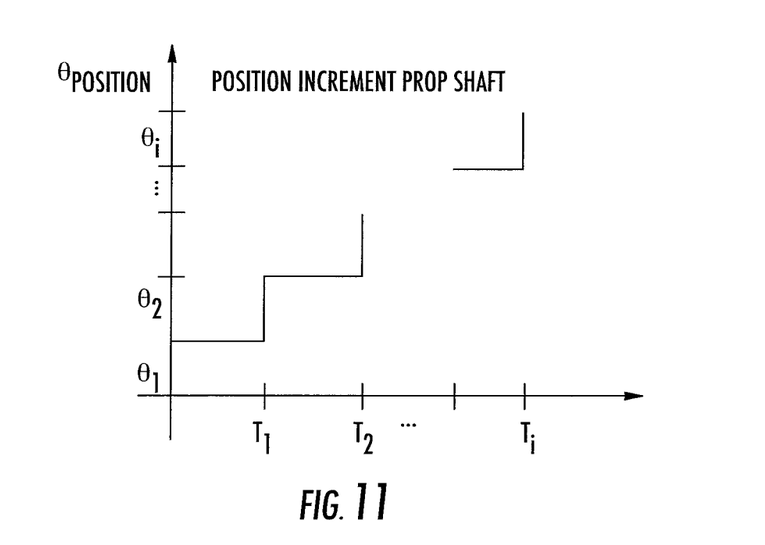
FIG. 11 is a graph illustrating the relationship between clutch torque and a motor position according to an embodiment of the presently disclosed subject matter.

The equations above illustrate the relationship between the model of the clutch torque and clutch-actuation-motor position, and the actual propeller shaft 120 rotational speed measurements. In the equations above, $\theta_i$ represents measured/estimated (relative) propeller shaft 120 rotational position, and the right hand side of the equations contains the processing of the model information. $T_{clutch,model}$ represents modeled clutch torque; $pos_{clutch}(t)$ represents measurement of the known position increment of the propeller shaft 120; $T_{frict}(t)$ represents propeller shaft 120 friction; and $\omega_{prop}$ represents modeled propeller shaft 120 rotational speed. Integration provides a robust estimation of the propeller shaft 120 rotational position. Several estimation algorithms, including, but not limited to, a Kalman filter and a recursive least square algorithm may be utilized to estimate the friction. FIG. 11 illustrates a representation of the discrete position increment in time.

Figure 12:
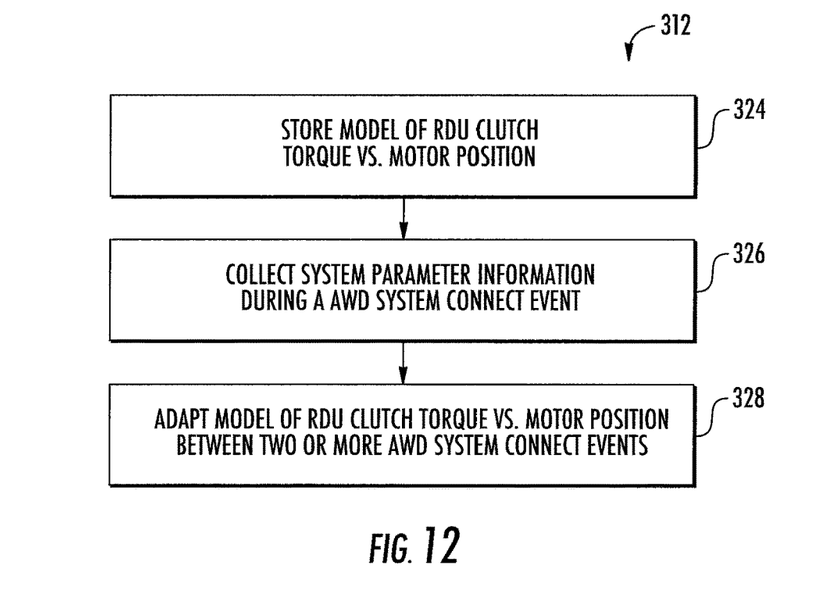
FIG. 12 is a flow chart illustrating a method of off-line model adaptation according to FIG. 5.

As illustrated in FIGS. 5 and 12, the off-line model adaptation 312 occurs while the clutch actuation system is not engaged, e.g., between two or more connect sequences. The off-line model adaptation 312 includes a step 324 comprising storing a model of the rear drive unit 112 clutch torque and clutch-actuation-motor position relationship. A step 326 of the off-line model adaptation 312 collects data during a clutch actuation event (i.e., data is collected while accelerating rotation of the propeller shaft 120) and processes the data at a time when enough calculation power is available. A step 328 of the off-line model adaptation 312 comprises utilizing the information from a complete clutch actuation event to adapt the model 324 that provides the relationship between the clutch torque and clutch-actuation-motor position.

Figure 13:
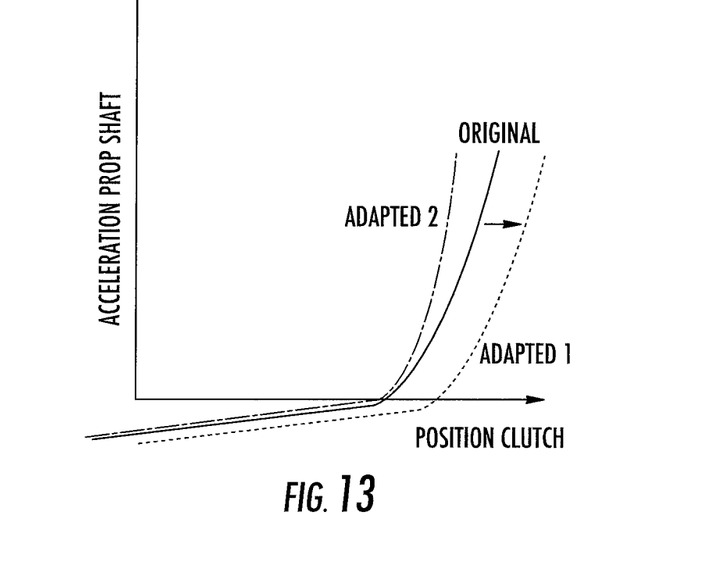
FIG. 13 is a graph illustrating a change in clutch position to compensate for a changing system according to FIG. 5.

FIG. 13 illustrates an example where the clutch torque model is adapted utilizing the clutch torque and clutch-actuation-motor position model equations and the collection of the propeller shaft 120 rotational speed and the clutch position information. As seen in FIG. 13, this may lead to a translation of the original curve (dashed line: adapted 1) or an adaptation of the shape (dotted line: adapted 2). This method allows compensation for a changing system due to the effects of, for example, wear.

Figure 14:
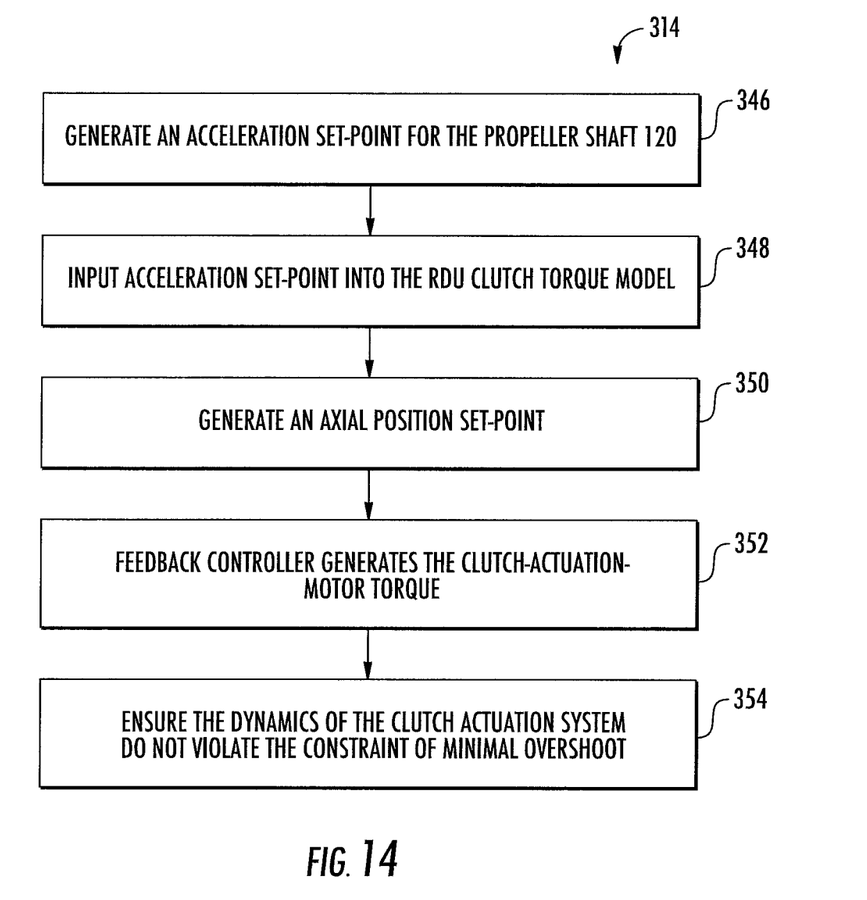
FIG. 14 is a flow chart illustrating a method of high-level control of a propeller shaft according to FIG. 5.

The second part of the third phase 303 of the clutch actuation includes high-level control 314 of the propeller shaft 120. An embodiment of the high-level control 314 is illustrated in FIG. 14. The high-level control 314 utilizes the clutch torque models 316, 324 of the on-line 310 and off-line 312 model adaptations and a dynamic model of the clutch actuation system (not depicted) to output a set-point for the driving element (e.g., clutch-actuator-motor torque/engaging force of the clutch, or electric current in a electrohydraulic system).

The high-level control 314 utilizes the on-line 310 and off-line 312 model adaptations to account for the dynamics of the clutch actuation system and minimize any overshoot of the required propeller shaft rotational speed. Acceleration of the propeller shaft 120 is equal to zero when the required rotational speed is achieved. A model predictive control or a multi-loop control architecture can be utilized to minimize the overshoot of the required propeller shaft rotational speed.

An example of the multi-loop control architecture is illustrated in FIG. 14. A high-level control 314 step 346 includes utilizing a feedback controller to generate an acceleration set-point for the propeller shaft 120 based on the propeller shaft 120 rotational speed information. A step 348 then utilizes the acceleration set-point of the propeller shaft 120 in the clutch torque model. The high-level control 314 further includes a step 350 which generates an axial position set-point. A step 252 comprises a feedback controller utilizing the axial position set-point to generate a set-point for the clutch-actuation-motor torque.

A step 354 of the multi-loop control architecture also includes an adaptive feedforward. The feedforward ensures the dynamics of the clutch actuation system do not violate the constraint of minimal overshoot of the required propeller shaft 120 rotational speed.

The set-point for the propeller shaft 120 rotational speed may either be pre-determined or calculated while online, such that the propeller shaft 120 rotational speed set-point meets the speed difference criterion for the power transfer unit 114 engagement. The propeller shaft 120 rotational speed set-point may be adjusted on-line, and thereby allows, but is not limited to, a trade-off between the duration of the clutch actuation event and the allowed system noise, vibration, and harshness. The propeller shaft 120 rotational speed set-point is based on the instantaneous value of the driving side of the disconnect system, and, as such, varies during the acceleration of the propeller shaft 120.

Once the targeted propeller shaft 120 rotational speed set-point is reached, the propeller shaft 120 rotational speed control will ensure that the actual rotational speed remains within certain boundaries around the set-point, i.e., the set-point remains updated based on the driving side of the disconnect system speed.

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative—not restrictive.

What is claimed is:

1. A method for controlling a vehicle all-wheel-drive system connect event, which comprises:
   providing a portion of a vehicle driveline including:
   a power transmission apparatus having a clutch,
   a propeller shaft selectively driveably coupled with said power transmission apparatus, a rear drive unit including a clutch pack assembly, wherein said rear drive unit is selectively driveably coupled with said propeller shaft, and actuating said clutch pack assembly of said rear drive unit, wherein said actuation comprises:

creating a control system that represents a relationship between a clutch torque and a clutch-actuation-motor position, inputting a parameter of said propeller shaft into said control system that represents said relationship between said clutch torque and said clutch-actuation-motor position;

storing said control system that represents said relationship between said clutch torque and said clutch-actuation-motor position in a vehicle system, utilizing information from a completed clutch actuation event to update said control system that represents said relationship between said clutch torque and said clutch-actuation-motor position, outputting a clutch driving element set point utilizing said control system that represents said relationship between said clutch torque and said clutch-actuation-motor position, and engaging said clutch of said power transmission apparatus.

2. The method for controlling a vehicle all-wheel-drive system connect event as recited in claim 1, wherein said power transmission apparatus includes a power transfer unit.

3. The method for controlling a vehicle all-wheel-drive system connect event as recited in claim 2, wherein said power transfer unit includes a power transfer unit clutch comprising a dog type clutch.

4. The method for controlling a vehicle all-wheel-drive system connect event as recited in claim 1, wherein said power transmission apparatus includes a transfer case.

5. The method for controlling a vehicle all-wheel-drive system connect event as recited in claim 1, wherein the step of inputting said parameter of said propeller shaft into said control system that represents said relationship between said clutch torque and said clutch-actuation-motor position includes, identifying a propeller shaft friction at a time sample utilizing a propeller shaft rotational speed measurement and said rear drive unit clutch torque, and inputting said propeller shaft friction into said control system that represents said relationship between said clutch torque and said clutch-actuation-motor position.

6. The method for controlling a vehicle all-wheel-drive system connect event as recited in claim 5, where said propeller shaft rotational speed measurement includes, providing a portion of said vehicle driveline including:

a speed sensor, a gear wheel coupled to said propeller shaft, wherein said gear wheel comprises gear teeth having a rising and falling edge, and utilizing said speed sensor to determine a time value between passing of each of a first rising, first falling, second rising, and second falling edge of said gear teeth, where passing of said rising and falling edges are indicated by an on state and an off state position increment, estimating said on and off state position increments, calibrating said propeller shaft on and off state position increments utilizing a known speed reference, updating said values for said on and off state position increments utilizing a filtering algorithm, estimating measured rotational speed of said propeller shaft at a time sample utilizing a sum of said rising and falling edges that have occurred in a time sample, and an instantaneous state of said speed sensor, and creating a propeller shaft rotational speed profile between two subsequent time differences to adjust said estimated rotational speed during data processing.

7. The method for controlling a vehicle all-wheel-drive system connect event as recited in claim 1, wherein the step of outputting said clutch driving element set point utilizing said control system that represents said relationship between said clutch torque and said clutch-actuation-motor position includes, generating an acceleration set point for said propeller shaft, inputting said acceleration set point for said propeller shaft into said control system that represents said relationship between said clutch torque and said clutch-actuation-motor position, generating an axial position set point for said propeller shaft, and generating a torque value for a clutch actuation motor.

8. The method for controlling a vehicle all-wheel-drive system connect event as recited in claim 1, wherein the step of utilizing said information from said completed clutch actuation event to adapt said control system that represents said relationship between said clutch torque and said clutch-actuation-motor position comprises:

collecting the propeller shaft rotational speed information and rear drive unit clutch position information of said previously completed actuation of said rear drive unit clutch pack assembly.

* * * * *